(12) United States Patent
Lee

(10) Patent No.: US 6,594,848 B1
(45) Date of Patent: Jul. 22, 2003

(54) METHOD AND SYSTEM FOR POLISHING OPTICAL DISKS

(75) Inventor: Aaron J. Lee, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 396 days.

(21) Appl. No.: 09/698,865

(22) Filed: Oct. 27, 2000

(51) Int. Cl.[7] .................... A47L 25/00; G11B 3/58; B08B 11/02
(52) U.S. Cl. ................ 15/102; 15/21.1; 15/77; 15/97.1; 369/72
(58) Field of Search .............. 15/21.1, 77, 97.1, 15/102; 369/72

(56) References Cited

U.S. PATENT DOCUMENTS

| | | | | |
|---|---|---|---|---|
| 4,561,142 A | * | 12/1985 | Mischenko et al. .......... | 15/97.1 |
| 4,662,025 A | * | 5/1987 | Fritsch .................... | 15/246 |
| 6,199,238 B1 | * | 3/2001 | Huang .................... | 15/102 |
| 6,243,345 B1 | * | 6/2001 | Kwang ................... | 369/72 |

* cited by examiner

*Primary Examiner*—Robert J. Warden, Sr.
*Assistant Examiner*—S Balsis
(74) *Attorney, Agent, or Firm*—David M. Mason

(57) ABSTRACT

The present invention provides a system for cleaning and polishing an optical disk. The system comprises a tray having a circular floor and a parameter wall; an armature having at least two circular pads being rotatably coupled to the armature; and a mechanism for rotating the armature parallel to the floor and about a central axis of the wall being perpendicular to the floor. The mechanism rotates the armature in a first direction, which in turn rotates each pad in a second direction to clean and polish the optical disk.

20 Claims, 5 Drawing Sheets

METHOD AND SYSTEM FOR POLISHING OPTICAL DISKS

BACKGROUND OF THE INVENTION

1. Field of the Invention

This invention relates in general to an optical disk polishing device, and more particularly to a process and apparatus for resurfacing an optical disk without damaging the data contained thereon.

2. Description of the Related Art

Over the past decade, optical disks have become the most widely used median for storing acoustic, video and audiovisual data for both consumers and manufacturers. This wide use can be seen in both stationary and portable devices. With the portable devices, it is not uncommon that the optical disk may be exposed to relatively harsh environments. In particular, the compact disk ("CD") or Digital Versatile Disk ("DVD") may be exposed to water, dust, or contaminates such as food and beverages. In addition, media for portable devices are more likely to be carried in shirt pockets, briefcases, backpacks, purses, and automotive compartments where a foreign object may reside unknowingly that could damage or scratch the media. Damaged optical disk's typically result in audible corruption or hinder a portion or all of the media's contents.

The CD and DVD are made from a rigid material having a diameter of either 80 or 120 mm, respectively. In addition, most optical disks are provided with a substrate to protect the recording layer and integrity of the data contained on the disk. However, it can be easily damaged if scratched or exposed to the various contaminates described above. If the recording surface is scratched, stained or otherwise undesirably affected, its appearance is impaired and pieces of information recorded in that area are unlikely to be read out and reproduced correctly by a disk drive for doing the same. Many optical disk Players take advantage of Error Correction Code (ECC) to recover missing bits, or data, not readable by the laser of the CD Player/CD-ROM Player. However, ECC is not always successful correcting imperfections. In many cases the damage resides in critical areas on an optical disk or the damage to the disc may be too great for recovery. To cope with this problem, stains and the like may be typically removed by hand using a cloth, but scratches, indentures and physical defects must be removed by a mechanical disk-cleaning device.

The manual operation is laborious and time-consuming and, as stated above, has a drawback in that scratches, stains or the like may not be removed satisfactorily. In particular, in a secondhand CD shop, CD-rental agency, library or the like which has a large number of disks, which are lent or rented out frequently, much labor is unavoidable in removing scratches, stains or the like from disks. Similarly, some cases may involve proprietary data/audio information, not available in secondhand resources. This also proves true for recorded information on CD-R and CD-RW media, where much of the information compiled is not available by other means. Accordingly, it is strongly desired instead to remove scratches, stains or the like mechanically and automatically with a disk cleaner or polisher.

To meet such a demand, various disk cleaning systems have been proposed, however, very few are without problems. For example, a typical disk cleaner provides a cylindrical scouring member, such as a polishing pad, that is rotated in one direction while the disk to be cleaned is rotated in an opposite direction. If the cylindricality of the scouring member and the parallelism thereof with the side of the disk being scoured are not precisely maintained, undulations and the like are likely to result in the surface of the disk.

With the same or other disk-cleaning device, the problem with the cleaning process may involve how easy it is to properly remove the damage. It is desirable for a disk cleaner to provide both a scouring member for abrasion (for removal of a scratch) and a scouring member for polishing (for lubrication, for finishing). However, in many known disk cleaners, only one scouring member can be pressed against the disk. Accordingly, there is a disadvantage in that replacement is frequently required between the scouring member for scratch removal and the scouring member for polishing.

Another problem that is common among known disk cleaners involves the force applied by the polishing pad to the disk. If the pressing force of the scouring member on the disk cannot be adjusted, the optimal pressing force may not be maintained as the scouring members become worn or deformed by the scouring operation. As a result, a scratch or stain may not be satisfactorily removed.

Lastly, many of today's disk cleaning devices are simply awkward to use, unreliable and inefficient during certain operations. This is typically apparent with systems that rely on numerous interactive parts during an operation. Therefore, the placement or removal of a disk or the replacement of the scouring member may be time consuming or cumbersome, or the system may experience part failures that may or may not be repairable.

Given the growing use of optical disks, particularly with a portable device where the likelihood of scratching a disk is very high, it would be advantageous to provide a resurfacing device that could be readily used by anyone from a single consumer to an optical disk manufacturing plant. In turn, it would be advantageous to provide a resurfacing device that is lightweight, durable and easy to use.

The present invention is directed to overcoming, or at least reducing, the above problems typically found with conventional disk polishing devices.

SUMMARY OF THE INVENTION

In one aspect of the present invention, a system is provided for cleaning and polishing an optical disk. The system comprises a tray having a circular floor and a perimeter wall; an armature having at least two circular pads being rotatably coupled to the armature; and a mechanism for rotating the armature parallel to the floor and about a central axis of the wall being perpendicular to the floor. The mechanism rotates the armature in a first direction, which in turn rotates each pad in a second direction to clean and/or polish the optical disk.

In another aspect of the present invention, a system is provided for cleaning an optical disk cleaning system. The system provides a tray having a floor and a perimeter wall, and a cleaning mechanism having an armature, at least two pads and a central post. The mechanism rotates the armature about the central post in a first direction to force the rotation of the at least two pads in a second direction.

In still another aspect of the instant invention, a method is provided for cleaning and polishing an optical disk being contained by a circular tray having a perimeter wall. The process includes the steps of centrally positioning an armature having at least two pads within the tray such that a side portion of each pad contacts the wall and a bottom surface of each pad contacts the optical disk; and rotating the armature about a central axis of the tray in a first direction to rotate the at least two pads in a second direction.

BRIEF DESCRIPTION OF THE DRAWINGS

Other aspects and advantages of the invention will become apparent upon reading the following detailed description and upon reference to the drawings, in which.

Figure 1:
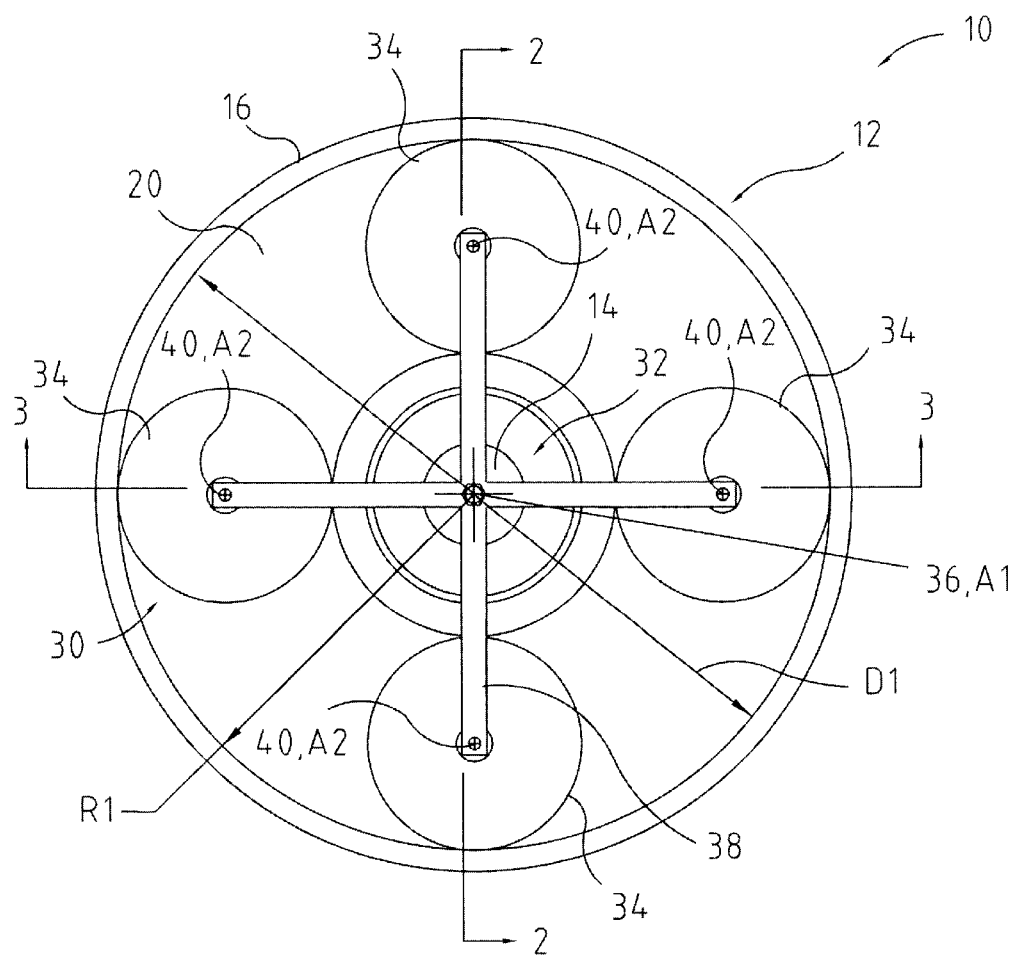
FIG. 1 illustrates a top view of the inventive disk cleaning system.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

In general, the present invention provides an apparatus for efficiently and effectively cleaning and polishing an optical disk, such as a compact disk ("CD") or Digital Versatile Disc ("DVD"). The inventive apparatus includes a tray for containing an optical disk and a cleaning mechanism. More specifically, the tray provides a floor that can centrally secure an optical disk on a planar surface being surrounded by a containing wall that defines a diameter and circumference. In a preferred embodiment, the cleaning mechanism provides an armature having four arms and a central post for rotating the armature in a first direction. A pad couples to each arm such that the distal ends of at least two pads contact a portion of the tray wall along a single plane being parallel with the planar surface of the floor. Any pad that contact the wall will be equally displaced from the central post, equally displaced along the circumferential border of the containing tray wall, and rotate in a second direction as the central post is rotated in a first direction.

During the operation of the inventive cleaner, a user centrally positions the armature within the tray such that a side portion of each pad contacts the wall and the entire bottom surface of each pad contacts the optical disk. Next, a motor rotates the armature about the central post in a first direction, which in turn forces each pad to interact with the tray wall and rotate in a second and opposite direction. Once an adequate amount of time has passed to clean and/or polish the optical disk, the user removes the armature and optical disk from the tray. With this cleaning process, the disk contained on the tray can be effectively and efficiently polished and cleaned without enduring the negative effects of conventional disk cleaning systems as described earlier.

Figure 2:
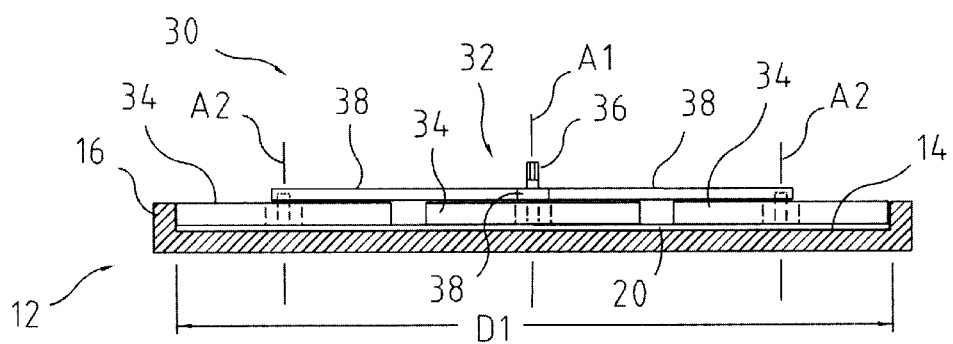
FIG. 2 illustrates a partial cut-away view of the system of FIG. 1.
Figure 3:
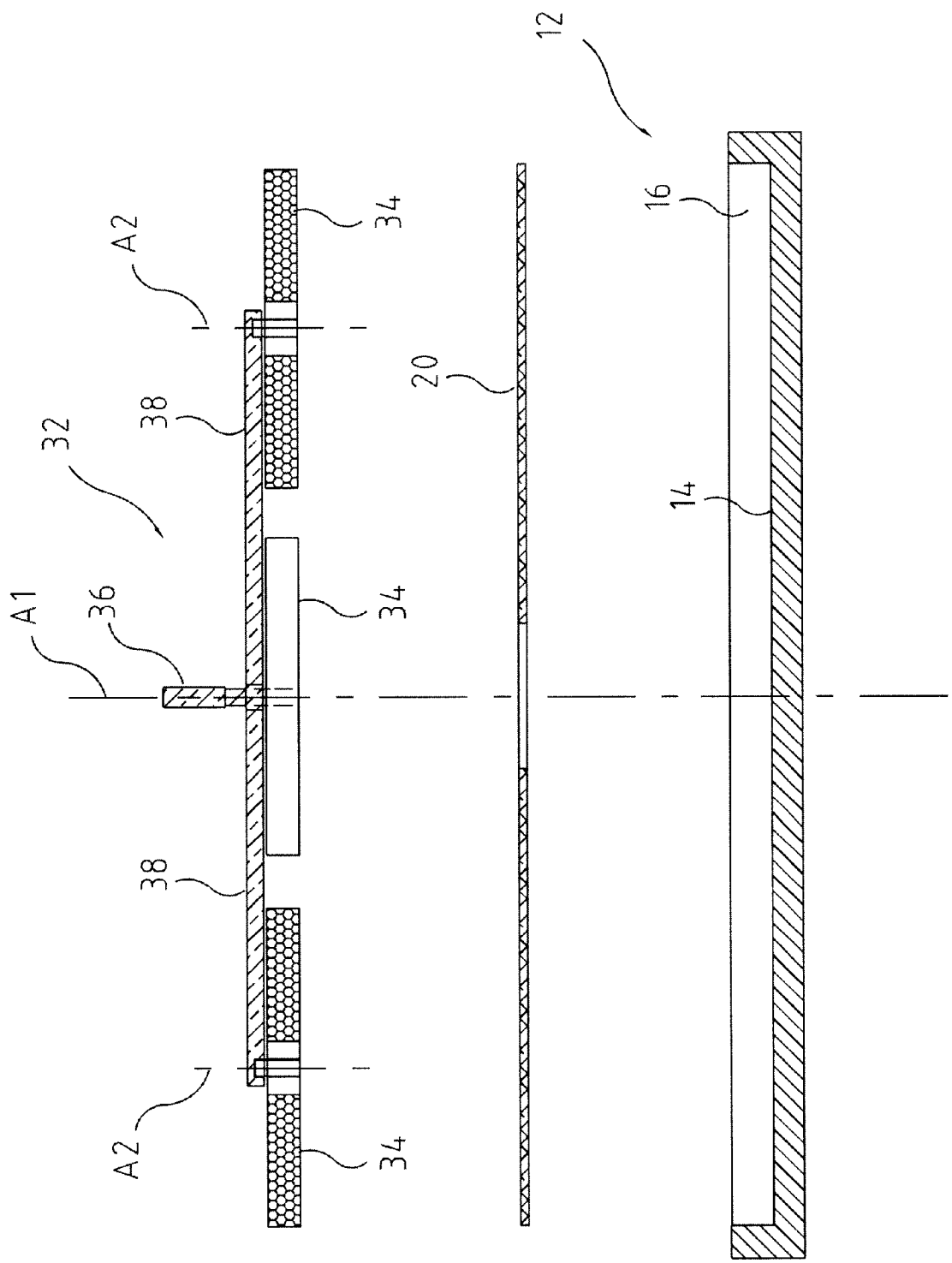
FIG. 3 illustrates an exploded cut-away view of the system of FIGS. 1 and 2.

Turning now to the drawings, FIGS. 1, 2 and 3 illustrate a top, a partial cut-away and an exploded cut-away view of the inventive disk cleaning system 10 in accordance with a preferred embodiment of the invention. Generally, the system 10 includes a tray 12 and a cleaning mechanism 30. In particular, the tray 12 includes a planar floor 14 and a perimeter wall 16. The wall 16 defines an inner diameter D1 and circumference being centered about an axis A1 that is perpendicular to the tray floor 14. The wall 16 defines the planar surface area of the floor 14 for containing an optical disk 20 within the tray 12. In a preferred embodiment, the floor surface provides a conventional material or compound having an adhesive property to secure the optical disk 20 to the floor during an operational cycle. However, as will be described in further detail below, the floor could also include a conventional pneumatic system or disk mounting mechanism for doing the same.

The cleaning mechanism 30 generally includes an armature 32 having a plurality of pads 34. In a preferred embodiment, the armature 32 provides a post 36, four arms 38, and four pads 34. Each arm 38 extends an equal distance away from the post 36 and defines a 90-degree angle between each adjacent arm 38 of the post 36. By equally positioning the arms 38 about the post 36, the cleaning mechanism 30 can provide an equal distribution of force to all arms 38 and pads 34 of the armature 32. This equal distribution of force to the arms and pads translates to the disk 20 being contained by the tray for cleaning and/or polishing, which in turn prevents uneven polishing operations as the armature 32 rotates.

The skilled artisan should appreciate that the same equal distribution of force can also be obtained if less or more arms are provided on the armature as long as the separation between each arm is equal. In other words, if the armature provides three arms, each arm provides a 120-degree separation angle from an adjacent arm along a planar surface parallel with the tray floor. Similarly, if the armature provides two or five arms, each arm will have a 180 or 72-degree separation angle from an adjacent arm, respectively. In this system, increasing the number of polishing/scouring members, also increases the effectiveness of the system in surface area. This design may prove the use of more (4 polishing members, rather than 2 pads) pads to increase the efficiency in recovering optical-surface defects on the disc.

Each pad 34 couples to a distal end of each arm 38 by a conventional securing element 40. In a preferred embodiment, the pads 34 couple to the arms 38 by a rivet so that each pad can rotate as they interact with the tray wall 16. If desired, each pad 34 could include a conventional ball bearing pack 42 (see FIGS. 4 and 5) that would interact with the securing element, and allow each pad to freely rotate about the securing element. Each securing element 40 defines a rotational axis A2 for each pad to rotate about a plane that is parallel with the tray floor 14.

The distance from the center of the post 36, or the rotational axis A1 of the armature 32, to an outer edge of a pad 34 defines a radius R1 that is equal to half the diameter D1 as defined by the tray wall 16 and floor 14. A skilled artisan should appreciate that the radius RI from the post 32 to the distal end of each pad 34 may not be identical if the cleaning mechanism 30 provides pads 34A that may not interact with the tray wall 16 (See FIGS. 4 and 5). Similarly, the length of each arm 38 may not be the same if any one of the pads provides a different diameter or shape, or the cleaning mechanism 30 is formed to only have two arms 38 with the same radius R1. However, as described earlier, if only two arms 38 have the same radius R1, these arms 38 would extend along a single axis (e.g. from 0 to 180 degrees) to form the diameter D1 of the floor wall 16.

Figure 4:
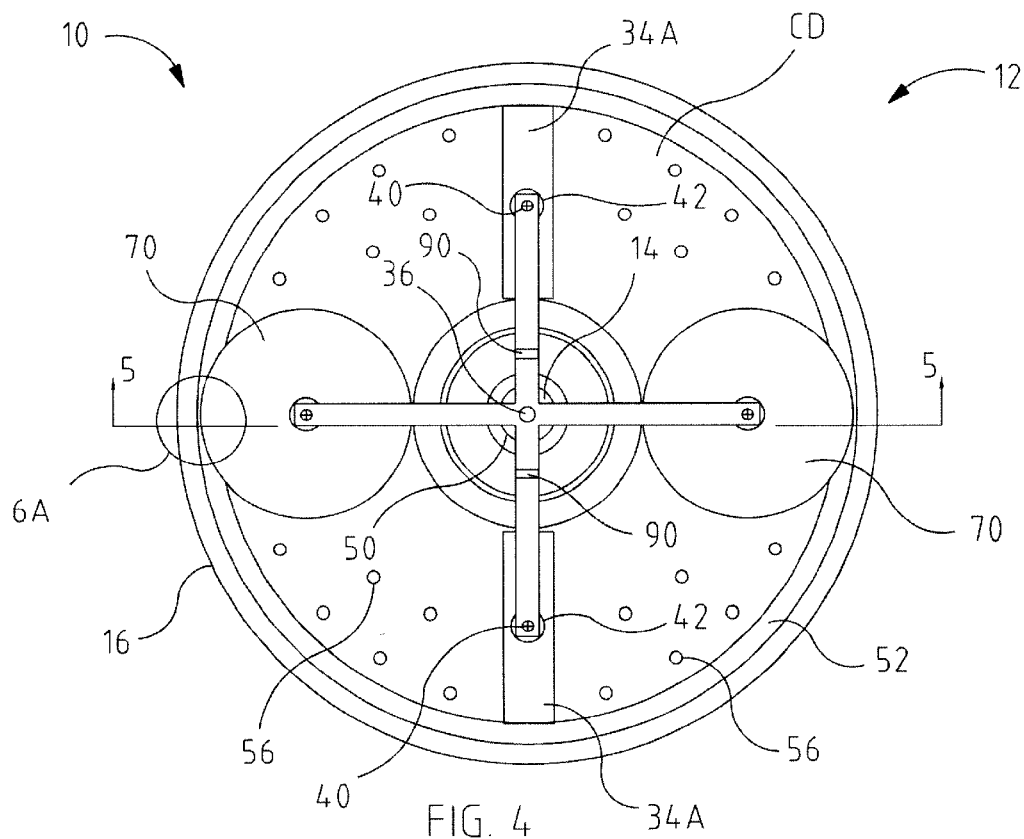
FIG. 4 illustrates a top view of a disk cleaning system in accordance with another embodiment of the present invention.
Figure 5:
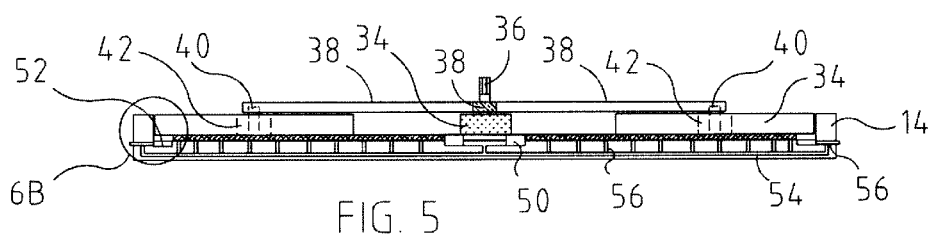
FIG. 5 illustrates an exploded cut-away view of the system of FIGS. 4.

Referring now to FIGS. 4 and 5, a top and partial cut-away view illustrate an alternative embodiment of the present invention. This embodiment provides many of the same components used above, therefore the same reference number for those components will be used to indicate the same components of the following alternative embodiment.

As above, a perimeter wall 16 surrounds the floor 14 of the tray 12. However, with this embodiment, the floor 14 also provides a conventional mounting knob 50 positioned in a central location of the floor 14 to assist with the positioning of an optical disk within the tray 12. In addition, the floor 14 includes a trench 52 and a venting system 54. The trench 52 resides within the floor 14 adjacent the perimeter wall 16 and provides a plurality of holes 56 that connect to a pneumatic device (not shown). The plurality of holes 56 that reside adjacent the wall 16 supply air or liquid within the tray during operation, or in the alternative, for suction air and dust created during the cleaning and polishing operation from the tray 12. The plurality of holes 56 that connect the floor 14 to the venting system use the pneumatic device to suction the disk 20 to the tray floor 14 during an operational cycle.

As will be described in more detail below, the operation of the inventive cleaning mechanism 30 includes rotating the post 36 of the armature 30 in a first direction to thereby allow two or more pads to interact with the wall 14 and rotate in a second direction. This interaction between the pads 34 and wall 14 may occur by the natural fiction created between the side surface of each pad 34 with the wall 14 or by a conventional mechanism to assist with the same.

Figures 6A, 6B:
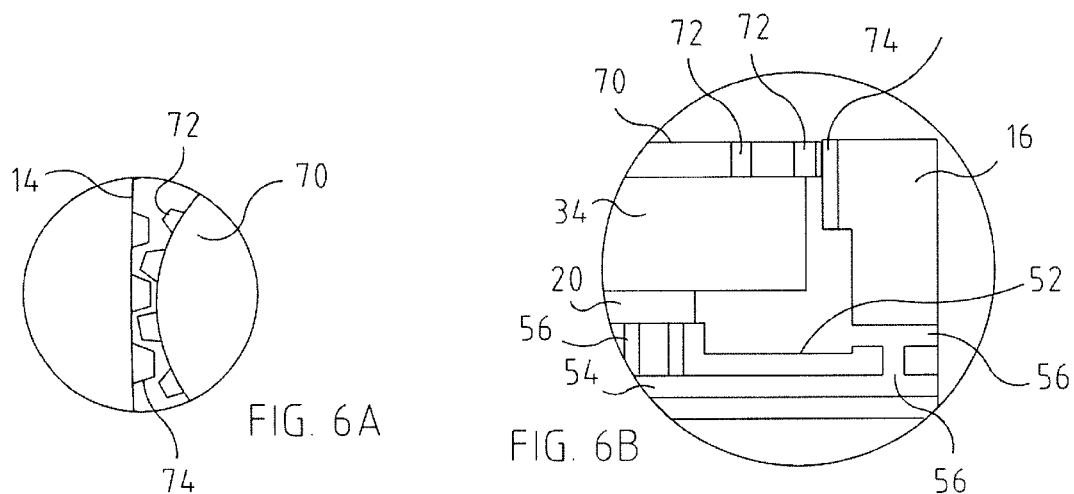
FIGS. 6A and 6B illustrate a top and side cut-away view of how the pad and wall may interact in accordance with one embodiment of the system shown in FIGS. 1–5.

FIGS. 6A and 6B provide a close-up view of FIGS. 4 and 5 to illustrate how a pad 34 can interact with the wall 14 when a convention gear type mechanism would be integrated with the present invention. With this embodiment, each pad 34 connects to a circular platform 70. The platform can be made from a ridged material, such as metal, and provides multiple cogs 72 around the perimeter for interacting with cogs 74 of the tray wall 14. With this reciprocating cog and wheel structure, each cog 74 of the wall 16 interacts with the cog 72 on the platform 70 to force the rotation of the each pad 34 in a second direction while the post 36 of the armature 32 is rotated in a first direction. The skilled artisan should appreciate that a conventional material having an adhesive property could be applied around the perimeter of the platform 70 and wall 14 to create enough friction to rotate each pad in a second direction as the post 36 and armature 32 rotates in a first direction.

In the above embodiments, the central post 36 couples to a motorized device (not shown) for rotating the cleaning mechanism 30 about the central axis A1. In such an embodiment, the device could include a conventional drill press. As will be described in more detail below, the user would only have to insert and secure the central post 36 into the drill press component for containing a conventional drill bit. Since the central post 36 would provide the same polygonal structure as a drill bit, no modification would be necessary to utilize the inventive cleaning system with a conventional drill press if desired, the central post 36 could incorporate a conventional spring like mechanism to function like a cushion to offer consistent downward pressure when the pads are applied to the disk by the drill press.

In an alternative embodiment, the inventive cleaning system 10 could be rotated by simply connecting a grip handle (not shown) to the central post such that a user could grab and turn the armature while positioned over a disk. Similarly, the inventive system 10 could be positioned within a large container (not shown) that would provide a conventional component for receiving and coupling the central post to a geared mechanism. The geared mechanism would allow the user to rotate a handle located outside of the container at a nominal speed so that the armature could rotate at a much greater speed. In the above embodiments, each pad 34 includes a conventional scouring or cleaning material. The tray, post and arm structures would be constructed with a ridged material such as steel or plastic, using a conventional molding technique.

As an alternative embodiment, the construction of the post and arm structure could involve the use of pivotal hinges 90 to couple the arms to the post and conventional welding or bolt/nut, or screws techniques for securing the same. The hinges 90 would allow the user to easily exchange pads on each arm without having to remove the cleaning system from the tray, and allow for specific arms to be secured in a position so that they could not interact with the optical disk during an operation.

For example, if the inventive four pad system of FIGS. 1–3 was used with two scouring pads and two cleaning pads, the user might decide to pivot the arms providing the cleaning pads to a secure and non-interactive position during a first stage of the cleaning process. Once the first stage is complete, the arms for the scouring pads could be pivoted to a secured and non-interactive position and the cleaning pads repositioned to an interactive position. Similarly, each arm 38 could be detachable from the armature. In other words, a conventional latch or clip element could be used to allow a user to attach, detach and interchange arms of the armature.

OVERALL METHOD

In the context of the description above, a user is taken to be a person. Those skilled in the art will readily understand that the present invention may be employed in an automated manufacturing environment, such as an assembly line, in which case the user is defined as a robotic system capable of performing particular actions under computer or processor control. In other words, a user may be a robotic system.

The robotic system includes a set of robotic arms and/or electromechanical actuating devices, where such arms and devices are generally well known. Such robotic arms and/or actuating devices are capable of 1) transporting objects; and 2) adjusting, engaging, and/or disengaging particular portions of a system. The aforementioned types of operations may involve the use of conventional light emitting and light detecting devices to aid position detection, in a manner readily understood by those skilled in the art.

Figure 7A:
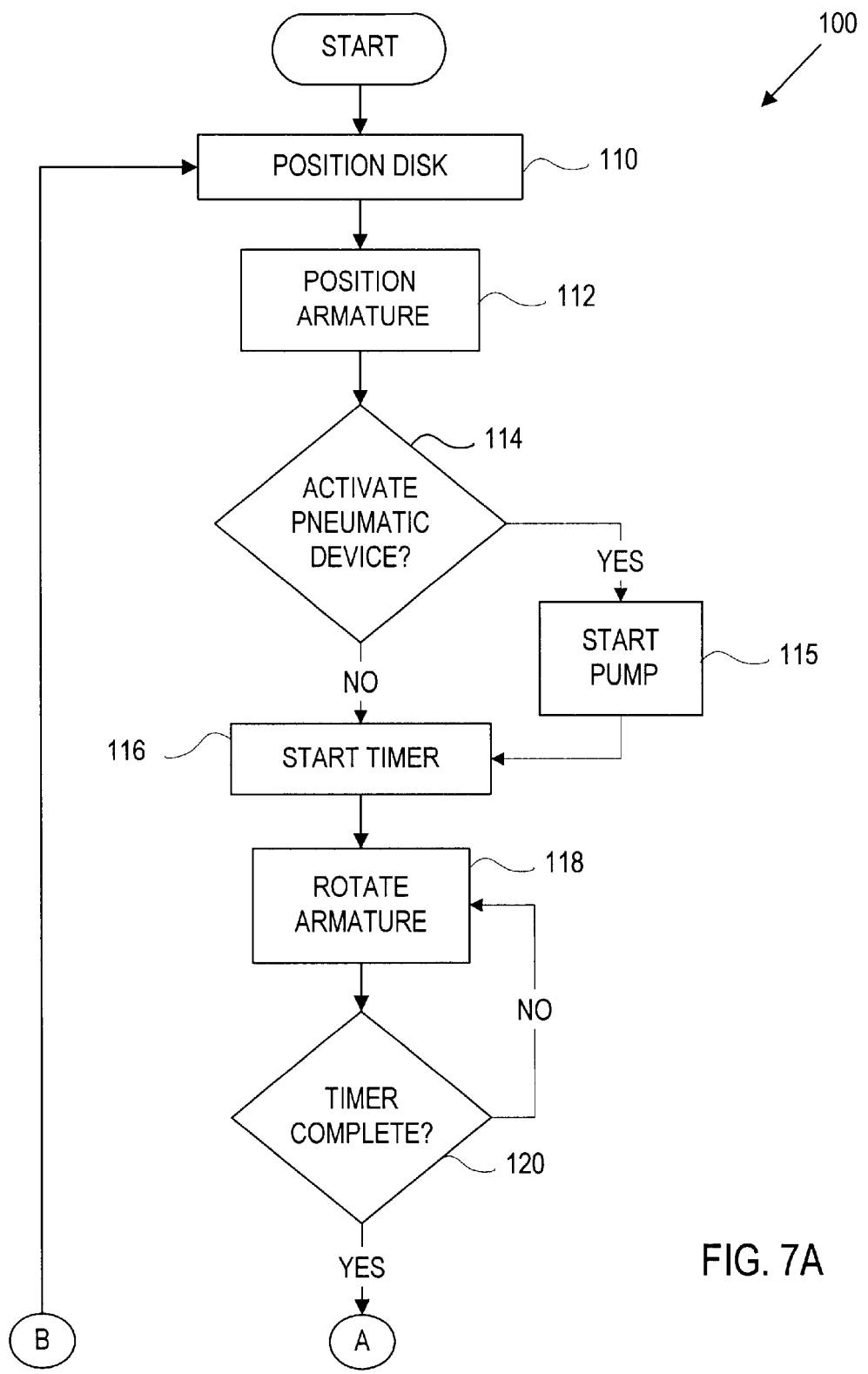
FIGS. 7A and 7B illustrate a flow chart for a process of using the inventive system of FIGS. 1–5.
Figure 7B:
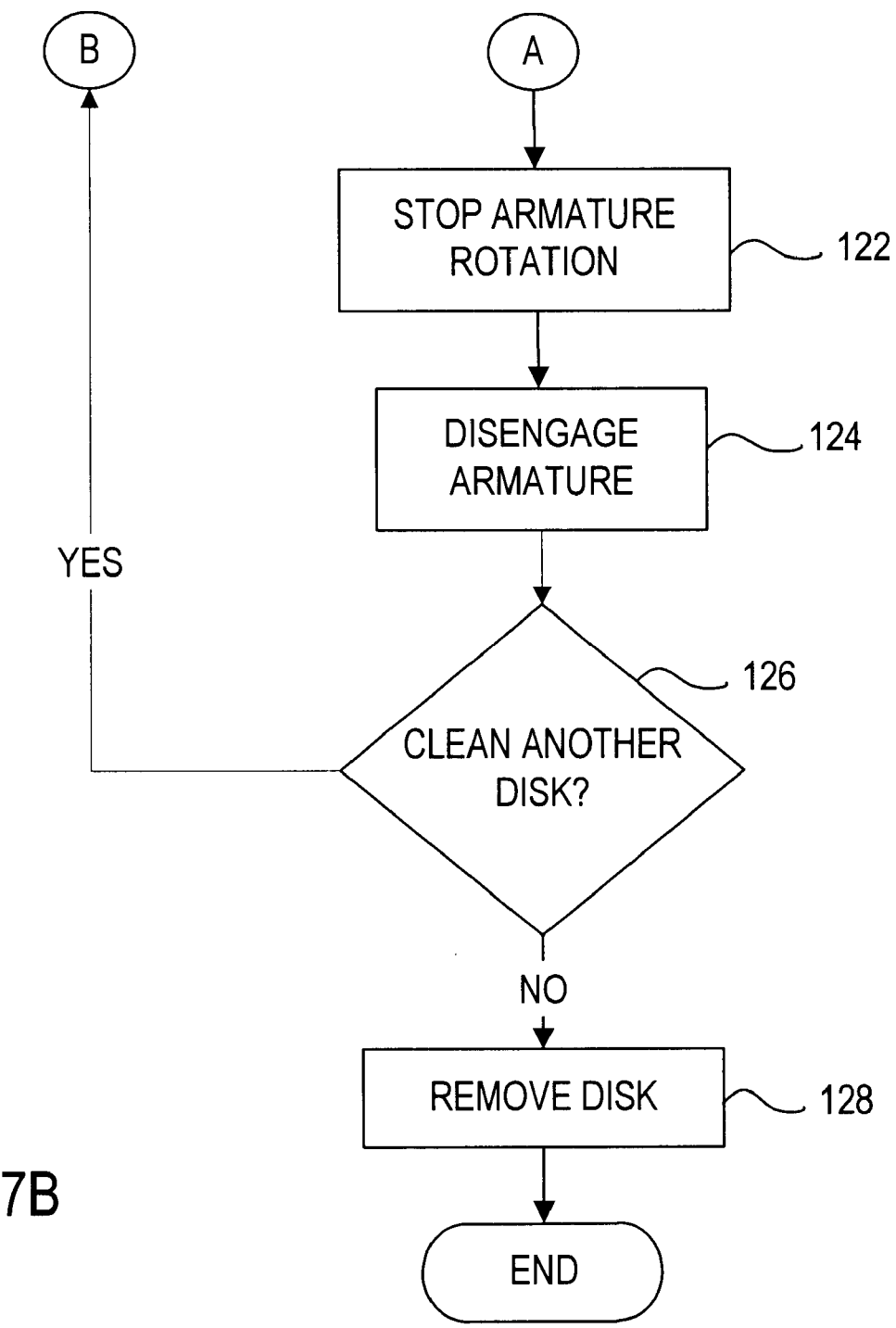

FIG. 7 is a flowchart of a preferred method 100 for treating optical disk surfaces in accordance with the present invention. In the description that follows, the optical disk is taken to be a compact disk ("CD") or Digital Versatile Disc ("DVD") that needs to be treated, i.e., cleaned or polished, to remove dust, scratches or an undesirable film. Those skilled in the art will recognize that the optical disk could also be selected from the group including a DVD, laser disk, and any rigid object that may need a surface dusted, sanded or scoured. Those skilled in the art will further understand that one or more of the following method steps could be performed manually as described above in the preferred embodiment. Consequently, the following will reference the components illustrated in the above figures.

The method begins in step 110, in which the robotic system positions an optical disk 20 onto the tray floor 14. Preferably, the disk 20 is positioned such that the disk will be centered within the area of the tray floor. Next, as recited in step 112, the robotic system positions the armature 30 such that a side portion of the pads 34 interact with a side portion of the tray wall 16, and a bottom portion of the pads 34 resides on the optical disk surface for cleaning. If a pneumatic mechanism is to be employed during operation 114, the necessary pumps will be activated 115 to force cool air to or remove dust from the tray. Whether or not a pneumatic mechanism is activated, the system will typically start a timer 116 before the robotic system subsequently rotates the armature 118 in one direction about the rotational axis Al to clean or polish a disk 20. When the armature starts to rotate in one direction, each individual pad 34 that contacts the wall will rotate in a second and opposite direction along their own rotational axis A2. With both the pads and armature rotating, the optical disk can be cleaned in an effective and efficient manner.

When the timer is complete 120, the rotation of the armature will be stopped 122 and the armature disengaged 124 from the tray. With the armature disengaged, the system will determine if another optical disk surface needs to be cleaned 126. If all optical disk surfaces have been cleaned the optical disk will be removed 128 and the system will end. However, if another optical disk needs to be cleaned or the other side of the current optical disk needs to be cleaned, the process starts over at step 110 by positioning the optical disk. The above process repeats until all optical disks have been cleaned.

A skilled artisan should appreciate that the step of activating the pneumatic system and the timer may not be necessary or desirable for the inventive device. This is particularly true if the device is to be used in a small operation, like at home, where there is little room for the extra equipment to run the pneumatic mechanism.

What is claimed is:

1. A system for cleaning an optical disk, the system comprising:
   a tray having a floor and perimeter wall for containing the disk;
   an armature having at least two arms and a rotational post positioned between the arms to define an axis being perpendicular to a central point of the floor;
   a cleaning pad coupled to a distal end of each one of the at least two arms; and
   a mechanism for rotating the armature about the axis and across a plane being parallel with the floor while each pad interacts with the wall and disk,
   wherein the armature rotates in a first direction and each pad rotates in a second direction.

2. The apparatus of claim 1, wherein the floor includes a disk-mounting element positioned in a central location on the floor for securing the disk to a planar surface of the floor.

3. The apparatus of claim 1, wherein mechanism further includes a positioning device for moving the armature in and out of a central area of the tray.

4. The apparatus of claim 1, wherein the at least two arm being position along a 0 and 180 degree axis parallel with the tray floor.

5. The apparatus of claim 1, wherein the at least two arms further include three arms being position along a 0, 120 and 240 degree axis parallel with the tray floor.

6. The apparatus of claim 1, wherein the at least two arms further includes four arms being position along a 0, 90, 180 and 270 degree axis parallel with the tray floor.

7. The apparatus of claim 6, wherein the arms positioned along the 0 and 180 degree pivotally coupled to the armature.

8. The apparatus of claim 7, wherein at least two arms pivotally coupled to the armature may be locked into a position to prevent the pads from interacting with an optical disk during system operations.

9. The apparatus of claim 6, wherein two of the four pads may be selected from the group including sanding, dusting, polishing, scouring and cleaning pads.

10. The apparatus of claim 1, wherein a portion of the tray wall and pad provide a mechanism for rotating the pads in the second direction as the armature rotates in the first direction.

11. The apparatus of claim 10, wherein the mechanism may be selected from the group of a material having an adhesive property and a gear and cog structure applied between the wall and a side portion of the pad respectively.

12. The apparatus of claim 1, wherein the tray floor further includes a material having an adhesive property to prevent the disk from moving while the armature rotates and the pads interact with the disk.

13. The apparatus of claim 1, wherein the armature is made from a material selected from the group including steel, alloy and a hard composite resin.

14. The apparatus of claim 1, wherein the tray further includes a trench adjacent the perimeter wall and floor and provides at least one circulation hole coupled to a pneumatic system for suctioning dust from the system during a cleaning operation.

15. The apparatus of claim 1, wherein the mechanism could be selected from the group including a drill press, a handle, and a gear driven device for a user to rotate the armature.

16. The apparatus of claim 1, wherein the floor further includes a plurality of holes being connected to a pneumatic device, during a cleaning operation the device creates suction through the holes to secure a disk to the floor.

17. An optical disk cleaning system, the system comprising:
   a tray having a floor and a perimeter wall; and
   a cleaning mechanism having an armature, at least two pads and a central post,
   wherein the mechanism rotates the armature about the central post in a first direction to force the rotation of the at least two pads in a second direction while the pads interact with the perimeter wall.

18. The system of claim 17, wherein the floor provides a component for centrally securing the optical disk on a planar surface of the floor.

19. The system of claim 17, wherein each pad rotatably couples to the armature such that a distal end of each pad contacts a portion of the tray wall along a single plane being parallel with the planar surface of the floor.

20. The system of claim 17, wherein each pad is equally displaced from the central post and along the circumferential border of the containing tray wall.

* * * * *